C. O. BLAUEL.
WATER MOTOR.
APPLICATION FILED MAR. 1, 1909.
945,367.
Patented Jan. 4, 1910.
4 SHEETS—SHEET 1.
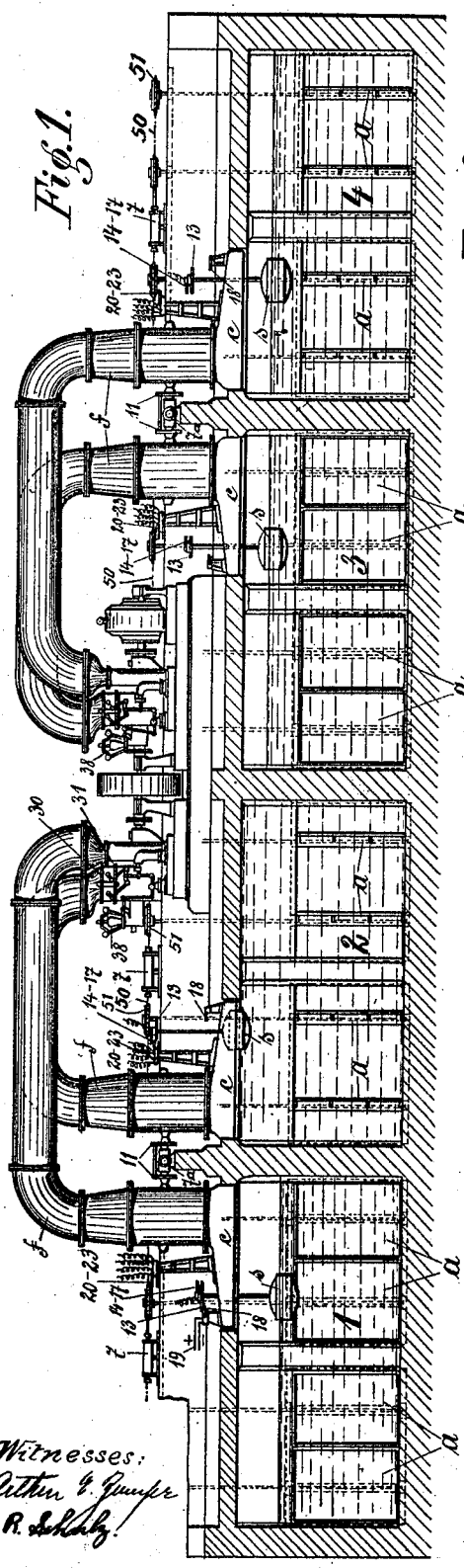

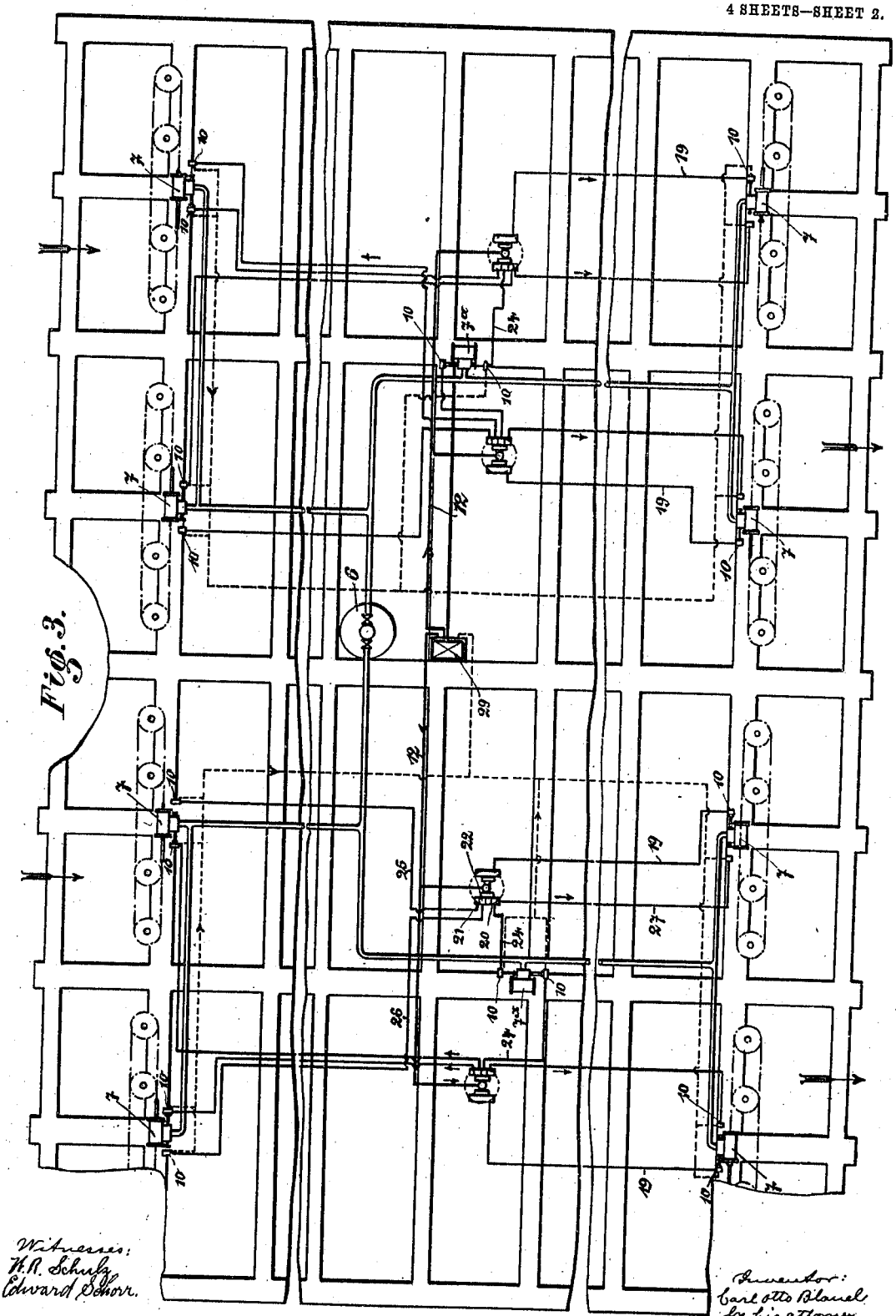

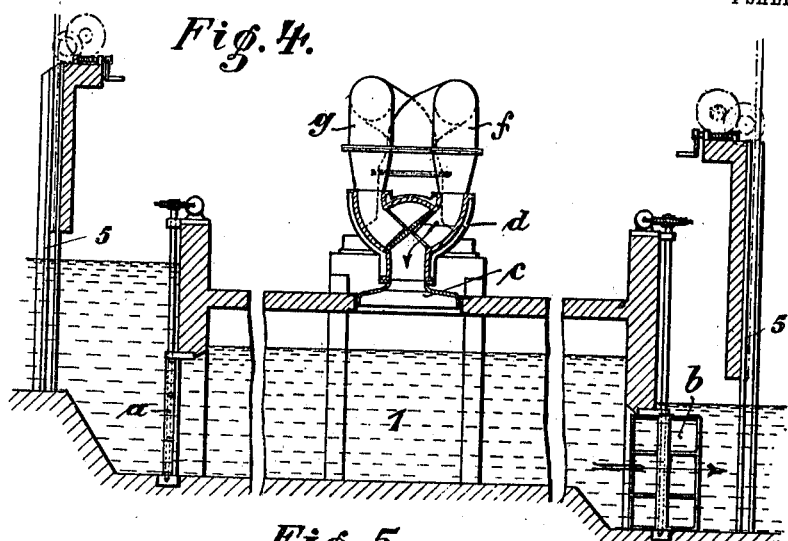
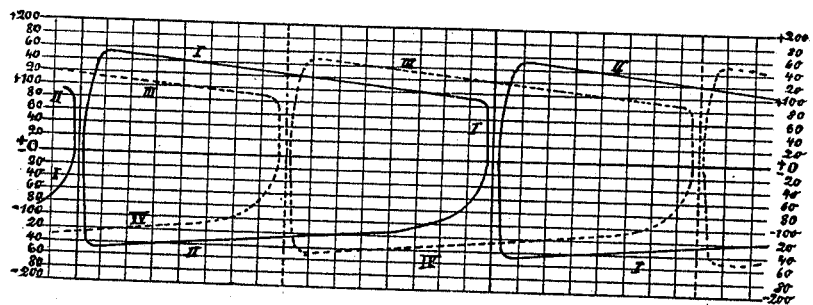
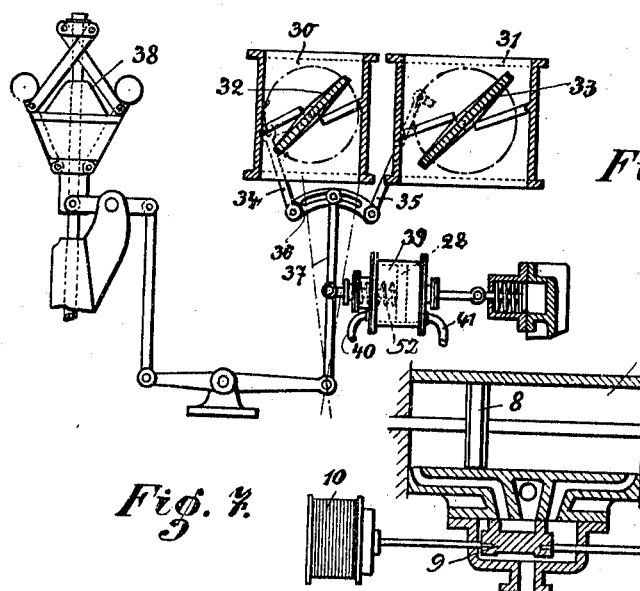

C. O. BLAUEL.
WATER MOTOR.
APPLICATION FILED MAR. 1, 1909.
945,367.
Patented Jan. 4, 1910.
4 SHEETS—SHEET 4.
Fig. 8.
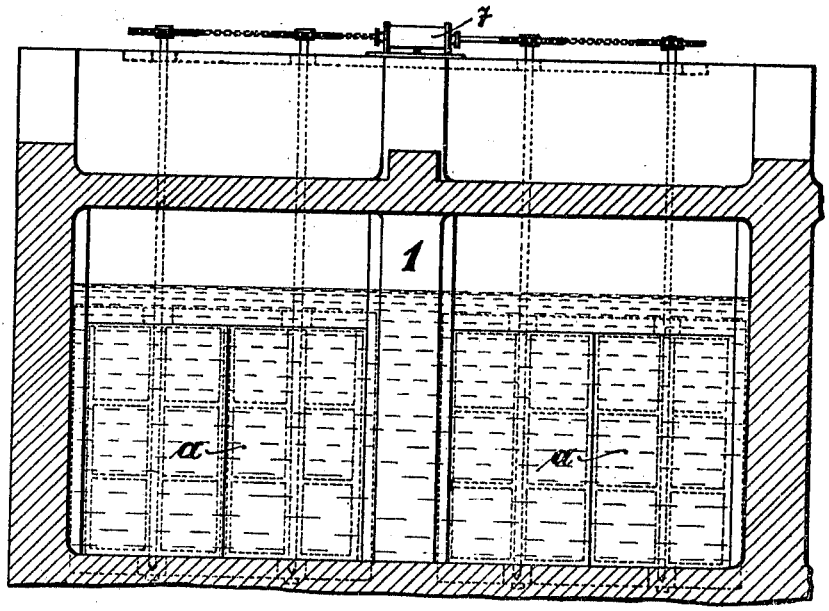
Fig. 9.
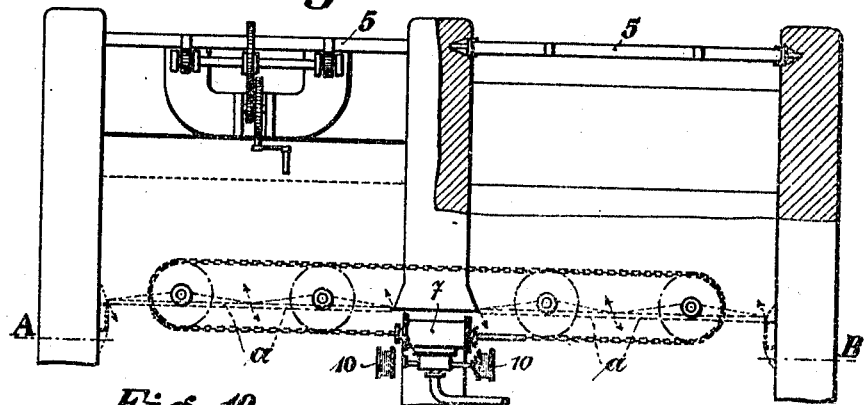
Fig. 10.
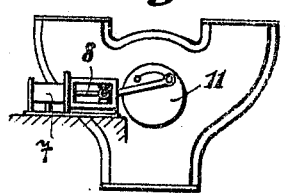
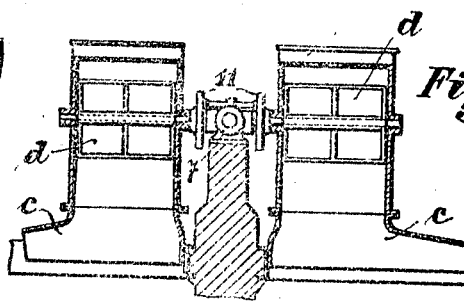
Fig. 11.
Witnesses:
W. R. Schulz.
Edward Schorr.
Inventor:
Carl Otto Blauel
by his attorney

UNITED STATES PATENT OFFICE.

CARL OTTO BLAUEL, OF DUSSELDORF-OBERKASSEL, GERMANY.

WATER-MOTOR.

945,367. Specification of Letters Patent. Patented Jan. 4, 1910.

Application filed March 1, 1909. Serial No. 480,572.

*To all whom it may concern:*

Be it known that I, CARL OTTO BLAUEL, engineer, a citizen of the German Empire, residing at Dusseldorf - Oberkassel, Barbarossaplatz 1, in the Province of Rhineland and State of Prussia, Germany, have invented new and useful Improvements in Water-Motors, of which the following is a specification.

The present invention relates to a novel water motor more particularly adapted for utilizing water falls, the essential feature being that intermediate the high and the low level-line of the water one or more basins are arranged, provided at their top with a pipe-track or duct and connected by means of this with a turbine or an air overcharge- and an air undercharge-vessel respectively, such basins being fitted at the side toward the high and at the side toward the low level-line with doors or similar devices, to be opened or closed in such a way, that the vessels are alternately filled and emptied, by which means air over- and air undercharge is continually produced.

One form of embodiment of the new system is shown in the accompanying sheets of drawings in which similar characters refer to similar parts throughout the several views.

Figure 1 shows it in longitudinal section Fig. 2 is a partial plan-view. Fig. 3 demonstrates the whole of the distributing plan diagrammatically, likewise in plan-view. Fig. 4 is a cross-section of a basin and Fig. 5 a diagram, the load being even. The Figs. 6 to 7 and 9 to 11 are illustrative of details. Fig. 8 is a partial longitudinal section taken on the direction of the line A to B of Fig. 2.

My improved water motor comprises four water- and air-tight basins 1, 2, 3 and 4, which are preferably made of reinforced concrete. The basins are provided at their heads, for allowing the inflow and outflow of the water, with doors $a$, $b$ free to pivot on their vertical center-shaft and placed below the deepest level-line of the water, which during the operation is attained, as far as they are concerned. At the top of the basins, sockets $c$ are mounted, opening into a chamber, of which two pipes $f$, $g$ conducting to the turbine, are branching off and in which is a change-flap $d$ for the purpose of alternately shutting off the one or the other pipe-line. At both sides of the basins, sluices or lock-gates 5 are arranged, which, when the basins are to be cleaned, are closed, so as to allow the basins to be pumped dry.

Two turbines A, arranged on a common shaft are provided, and every two basins, placed coadjacently, operate in conjunction, this means thus, 1 with 2 and 3 with 4, that is in such a manner, that the basins working together, are connected by pipings with one and the same turbine so that water flows into one basin while water is flowing out of the other, so as to exert simultaneously a forcing and a sucking effect on the turbines.

Compressed air, which in an electromagnetic way is distributed by means of float-gages $s$ is managed to control differently the doors $a$, $b$ and the change-flaps $d$.

The compressed air and electric power may be produced by a compressor and dynamo operated from the shaft of the turbine. The compressor feeds a tank 6 serving as a storage-vessel, from which lines conduct to the various contrivances for operating the doors and flaps. The coming around of the doors may be carried out by means of a piston 8 shiftable in the cylinder 7 as shown in Fig. 7. A valve is provided for the purpose of regulating the inlet and exit of the compressed air in these cylinders; such valve may, however, be supplanted, as shown, by a slide 9, which is displaced in one or the other direction by magnets (electromagnets 10) the circuits of which are locked or opened in the given moment. The rods of the piston 8 protruding on both sides from the cylinder 7, are connected by means of chains 50, passed over chain-wheels 51, mounted on the axes of the turning-doors of a basin, as shown in Fig. 9. The turning of the flaps $d$ is likewise effected by pistons 8 arranged in cylinders 7 and actuated by a slide, these pistons being jointed by means of connecting-rods with cranks or crank-disks 11, of the flaps, as demonstrated in the Figs. 10 and 11.

The contacts for the electromagnets are established, as mentioned already in the foregoing, by means of float-gages $s$. These are connected by lines 12 with a current-generator, the dynamo 29, and they carry contacts 13 and 14 to 17. When the float-gage of the basin 1 sinks down and when it has arrived in its deepest or approximately in its deepest position, it strikes with a contact 13 against a contact 18, connected by means of a line 19 with the one of the magnets for operating the door, serving as a locking device and arranged at the exit-side of the corresponding basin. Consequently the inlet-slide in question 9 is attracted and the incoming compressed air displaces the piston in such a manner, that the doors get closed. At the expiration of one to two more seconds, however, also the float-gage in the basin 2, coöperating with this basin, has attained its top-position in which it strikes with its contacts 14 to 17 against contacts 20 to 23. Of these 20 is connected by means of a line 24 with the one of the magnets, having the purpose of moving the two change-flaps, arranged in the pipings conducting from the two basins to the turbines. In this way the magnet gets connected up with the current-generator with the effect of turning down the flaps; the suction-conduit of the basin 1 is being closed and the forcing-conduit is opened, whereas, on the other hand, in the basin 2 the forcing-conduit is closed and the suction-conduit is opened. The contacts 21 to 23 are connected by means of lines 25, 26, 27 with the one magnet and the devices, serving the purpose of changing the communication of the rest of the doors of both basins. The doors arranged on the basin 1 at the point of inlet are opened; at the second basin, however, the doors arranged on the point of inlet are closed, while the doors arranged at the point of exit are opened. When the water in the second basin and the float-gage contained therein have reached their deepest position, and when the water in the first basin and the corresponding float-gage have arrived at the top, the float-gage, contained in the second basin abuts with its contact 13 on a contact 18 and the float-gage, contained in the first basin 1 strikes with its contacts 14 to 17 against the contacts 20 to 23, the wires of which are in connection with the electromagnets, which reverse the distribution of the compressed air-pistons with a view to change the communications of all flaps and doors from the open into the closed position and vice versa. Consequently the flaps $d$ and the doors $a$, $b$ are differently arranged. The changing of the communications of the two groups of basins, 1, 2 and 3, 4 respectively takes place, as far as possible, in equal intervals but at different moments, that is in such a manner, that the managing of the altered arrangement of the one group takes place in the midst of the operative period of the second group and vice-versa. Consequently the one group is in full work when the other is differently arranged and the capacity of the one group, reduced for one second, i. e. during the changement of the communications, can be made good to the greater amount by a convenient distribution from the other turbine. The flywheel may consequently be kept in normal limits, without prejudicing the even operation of the machine.

When the upper water-level is placed at 2.5 m. above the lower water-level, it is advisable to arrange the basins in such a way, that the inner face of the top-wall has its position by 1.6 m. above the lower water-level and that the water is evacuated only as far as a height of 0.9 m. above the lower water-level. Consequently the atmospheric pressure is kept in average limits except during the moment when the changing of the communications takes place, and the variations of the pressure are not of such a nature, that they can take an adverse influence on the efficiency of the turbines.

The diagram, as demonstrated in Fig. 5 shows the effect of the several basins as well as the effect of the whole plant. The reference-numerals 1 to 4 mark the work-diagrams of the basins 1 to 4.

It will be seen that during the change of one group of the turbines, the efficiency of the plant is reduced, owing to the inoperativeness of said group. In order to compensate for this deficiency, the work of the other group is increased by directly throwing the water against the low pressure vanes of the turbines. This partial direct throw of the water against the low pressure vanes is also advisable during the second half of the working period of one group, as then the difference between the over pressure in one basin and the under pressure in the other basin of the same group decreases, thus causing a corresponding decrease in efficiency.

The piping $f$ feeding the compressed air to the turbine, carries at its orifice two outlet-joints 30, 31 of which 30 conducts to the highest pressure-stage and 31 to a second or to a lower stage. In each of these joints a shut-off member 32 or 33 respectively is arranged to the axes of which crank-arms are secured, which by means of articular rods 34, 35 are hinged to a link 36. In this link a lever 37 connected with a piston 28 is movable, such lever being jointed by means of a rod-work with the regulator 38. The piston 28 is shiftable in a cylinder 39, suspended so that it can move, and connected left-hand by an elastic tube 40 with the main suction conduit and right hand by a pipe 41 with the main pressure conduit of the two coöperating basins 1, 2 or 3, 4 respectively. When the pressure is high, the piston 28 is pushed back, contrary to the action of a spring 52, and owing to this, the lever 37 in the slot is moved toward the left side. The curve takes in this such a course, that in the given arrangement the slot is pivoted on its fulcrum with the arm 34, so as to push the arm 35 upwardly and to close partially or entirely the flap 33 of the lowest pressure-stage. On the other hand the piston is shifted toward the right when a minimum of pressure prevails, and in this arrangement, the flap 32 is closed, by which means the compressed air is fed directly onto the low pressure-stage. Now, as the lever is in communication with the regulator, in accordance with my former deductions, this regulates respectively according to the lever in the slot being pushed toward the left or the right, the admission to the higher or to the low pressure-stage. When the lever is in a middle position, the admission to the two pressure-stages is regulated simultaneously.

To allow the valves to be locked safely, these or the rod-work may be effected by springs or balance-weights assisting the closing mechanism.

For starting the plant a small-size benzin or similar engine—or if electric power is available—a small electromotor can be provided. Such engine may also be used in case of serious repairs for pumping dry the basins. Before and during the setting to work, the water-level and the quantity of air in the several basins must be correspondingly regulated.

I claim:—

1. In a water motor of the class described, the combination of a number of basins, arranged between the high and the low level-line, and air- and water tight separation between same, doors provided at the side towards the high and at the side toward the low level-line, adapted to regulate the influx and the outlet of the water, such doors made to come around their vertical axis, at the top side of the basin socket, discharging in a chamber, pipes branching off from this chamber and establishing a connection between said chambers and a turbine, a change-flap arranged in the chamber, to shut off alternately one or the other piping, all substantially as set forth.

2. In a water motor of the class described, the combination of a number of basins arranged between the high and low level-line, an air- and water-tight separation between the same, doors provided at the side toward the high and at the side toward the low level-line, adapted to regulate the influx and the outlet of the water, such doors being made to come around their vertical axis, at the top side of the basin sockets, discharging in a chamber, pipes branching off from this chamber and establishing a connection between said chambers and a turbine, a change-flap arranged in the chamber to shut off alternately one or the other piping, means for operating the doors and the change-flap by compressed air, a float-gage adapted to distribute the compressed air, a valve-actuated piston shiftably arranged in a cylinder made to operate the doors, a regulating slide and means for displacing it in the one and in the other direction, chains connecting the rods of the piston, which protrude from both sides of the cylinder, chain-wheels located above the axes of the turning doors, connecting rods jointing the pistons with the cranks or crank-disks of the flaps, electromagnets, wires carrying contacts and connecting the same with the current generator, and means for displacing the piston, so as to shut the doors, all substantially as set forth.

3. In a water motor of the class described, the combination of multi-stage turbines, piping feeding compressed air to the turbine, carrying at the orifice two outlet-sockets, one of which leading to the highest and the other to a lower pressure-stage, in each of these sockets a shutting-off member, a piston slidable in a cylinder, connected on the one hand with the main force-piping and on the other hand with the main suction-conduit, crank-arms secured to axes, articular rods, hinged at the arms of a slotted link, and means for closing entirely or partially the shut-off members of the low pressure-stage, when a higher pressure prevails, all substantially as set forth.

4. In a water motor of the class described, the combination of a lever connected with a crank slidable in a slot, a rod-work connecting the lever with the regulator, the piston slidable in a movably suspended cylinder, an elastic tube connecting the cylinder left hand with the main suction-conduit and a pipe connecting it right hand with the main force-conduit of the coöperating basins, means provided for displacing the piston and lever to the right and left and for regulating the admission to the higher or to the lower pressure-stage, all substantially as and for the purpose set forth.

Signed by me at Barmen, Germany, this 13th day of February 1909.

CARL OTTO BLAUEL. [L. S.]

Witnesses:
 OTTO KÖNIG,
 WILLY KLEIN.